United States Patent
Eickhoff et al.

(10) Patent No.: US 11,469,434 B2
(45) Date of Patent: Oct. 11, 2022

(54) CHEMICAL HYDRIDE AMBULATORY POWER SOURCE

(71) Applicant: Honeywell International Inc., Morris Plains, NJ (US)

(72) Inventors: Steven J. Eickhoff, Brooklyn Park, MN (US); Jeffrey Michael Klein, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 195 days.

(21) Appl. No.: 16/552,361

(22) Filed: Aug. 27, 2019

(65) Prior Publication Data

US 2020/0099085 A1     Mar. 26, 2020

Related U.S. Application Data

(60) Provisional application No. 62/736,828, filed on Sep. 26, 2018.

(51) Int. Cl.
*H01M 8/2475* (2016.01)
*H01M 8/2457* (2016.01)
(Continued)

(52) U.S. Cl.
CPC ............. *H01M 8/2457* (2016.02); *C01B 3/08* (2013.01); *H01M 8/0243* (2013.01);
(Continued)

(58) Field of Classification Search
CPC ............. H01M 8/2457; H01M 8/0243; H01M 8/0258; H01M 8/04089; H01M 8/04201;
(Continued)

(56) References Cited

U.S. PATENT DOCUMENTS

| 6,179,586 B1* | 1/2001 | Herb ................. F04B 43/043 |
| | | 417/480 |
| 2004/0048049 A1* | 3/2004 | Merrill ................. B32B 5/18 |
| | | 428/209 |

(Continued)

FOREIGN PATENT DOCUMENTS

| EP | EP-3264509 A2 | 1/2018 |
| WO | WO-2008/097849 A2 | 8/2008 |

OTHER PUBLICATIONS

"VARTA Hearing Aid Batteries", [online]. [retrieved on Aug. 12, 2019]. Retrieved from the Internet: <URL: https://www.varta-microbattery.com/products/hoergeraetebatterie/?lang=en>, (2019), 3 pgs.

(Continued)

*Primary Examiner* — Cynthia H Kelly
*Assistant Examiner* — Jenna Shulman
(74) *Attorney, Agent, or Firm* — Schwegman Lundberg & Woessner, P.A.

(57) ABSTRACT

A power source includes a container, a fuel cell stack disposed within the container, the fuel cell stack having an anode side and a cathode side, a hydrogen producing fuel disposed within the container and positioned to provide hydrogen to anode side of the fuel cell stack, and a pump disposed within the hydrogen producing fuel to circulate water vapor through the hydrogen producing fuel. A capacitor may be coupled to receive electricity generated by the fuel cell stack.

13 Claims, 9 Drawing Sheets

(51) Int. Cl.
  *C01B 3/08*    (2006.01)
  *H01M 8/0243*  (2016.01)
  *H01M 8/0258*  (2016.01)
  *H01M 8/04089* (2016.01)
  *H01M 8/04082* (2016.01)
  *H01M 8/04746* (2016.01)

(52) U.S. Cl.
  CPC ..... *H01M 8/0258* (2013.01); *H01M 8/04089* (2013.01); *H01M 8/04201* (2013.01); *H01M 8/04753* (2013.01); *H01M 8/2475* (2013.01)

(58) Field of Classification Search
  CPC ... H01M 8/04753; H01M 8/2475; C01B 3/08; Y02E 60/50
  See application file for complete search history.

(56) References Cited

U.S. PATENT DOCUMENTS

| | | | |
|---|---|---|---|
| 2004/0161646 A1* | 8/2004 | Rezachek | C01B 3/065 429/421 |
| 2007/0011251 A1 | 1/2007 | McNamara et al. | |
| 2007/0217972 A1* | 9/2007 | Greenberg | C01B 3/08 422/232 |
| 2012/0094196 A1 | 4/2012 | Eickhoff et al. | |
| 2013/0196243 A1* | 8/2013 | Braithwaite | H01M 8/04067 429/440 |
| 2018/0205103 A1 | 7/2018 | Eickhoff et al. | |

OTHER PUBLICATIONS

"VARTA Rechargeable Lithoum-Ion Cells", [online]. [retrieved on Aug. 12, 2019]. Retrieved from the Internet: <URL: https://www.varta-microbattery.com/products/lithium-ionen-zellen/?lang=en>, (2019), 10 pgs.
Andreasen, Anders, et al., "Dehydrogenation kinetics of as-received and bail-milled LiAlH4", Journal of Solid State Chemistry, 178(12), (2005), 3672-3678.
Beattie, Shane D., et al., "Thermal conductivity and specific heat measurements of metal hydrides", ITCC Proceedings 11, (2009), 1-11.
Cabuz, Cleopatra, et al., "The Dual Diaphragm Pump", The 14th IEEE International Conference on Micro Electro Mechanical Systems (MEMS 2001), (2001), 519-522.
Coz, E., et al., "Water management in a planar air-breathing fuel ceil array using operando neutron imaging", Journal of Power Sources, 331, (2016), 535-543.
Park, Taehyun, et al., "A rollable ultra-light polymer electrolyte membrane fuel cell", NPG Asia Materials, 9, e384, (2017), 1-8.
Shah, Keyur, et al., "Novel microfabrication approaches for directly patterning PEM fuel cell membranes", Journal of Power Sources, 123(2), (2003), 172-181.
Steinbach, Andrew, "High Performance, Durable, Low Cost Membrane Electrode Assemblies for Transportation Applications", 2014 Annual Merit Review, DOE Hydrogen and Fuel Cells and Vehicle Technologies Programs, (Jun. 18, 2014), 26 pgs.
Zengerle, R., et al., "A micro membrane pump with electrostatic actuation", Proceedings. An Investigation of Micro Structures, Sensors, Actuators, Machines and Robot. IEEE Micro Electro Mechanical Systems, 1992, MEMS '92, (1992), 19-24.
"European Application Serial No. 19197976.4, Extended European Search Report dated Feb. 25, 2020", 8 pgs.

\* cited by examiner

CHEMICAL HYDRIDE AMBULATORY POWER SOURCE

RELATED APPLICATION

This application claims priority to U.S. Provisional Application Ser. No. 62/736,828 (entitled Chemical Hydride Ambulatory Micro Power Source, filed Sep. 26, 2018) which is incorporated herein by reference.

BACKGROUND

Small power sources utilizing fuel cells have difficulty providing surge currents that are useful for internet of things type devices, such as wireless sensors. Surge currents may be needed for such devices to transmit data effectively. While the power source can be made larger to satisfy surge currents, smaller sizes power sources are desired.

SUMMARY

A power source includes a container and a fuel cell stack disposed within the container. The fuel cell stack has an anode side and a cathode side. A hydrogen producing fuel is disposed within the container and positioned to provide hydrogen to the anode side of the fuel cell stack. A pump is disposed within the hydrogen producing fuel to circulate water vapor through the hydrogen producing fuel. A capacitor may be coupled to receive electricity generated by the fuel cell stack.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that changes may be made without departing from the scope of the present invention. The following description of example embodiments is, therefore, not to be taken in a limited sense, and the scope of the present invention is defined by the appended claims.

A chemical hydride ambulatory micro power source (CHAMPS) couples the high energy density and specific energy of fuel cell technology, with advanced micro fabricated fuel cell, thermally optimized packaging, and micro pump technologies to achieve a significant increase in power density.

Lithium battery technologies (e.g. Li-ion) that can achieve a power density metric have energy densities that are a factor of five too low for some applications. On the other hand, zinc-air batteries—with commercially available examples achieving approximately 1500 Wh/L—meet the energy density target but have power densities that are 10-100× too low for such applications. Zinc-air batteries also suffer from significant environmental sensitivity; their KOH electrolyte solution can dry out under low humidity (<25% RH) or become flooded under high humidity (>75% RH), altering the ionic conductivity and oxygen diffusivity and ultimately degrading performance. Moreover, under the high-power density conditions, dry out will be exacerbated by significant self-heating due to internal power dissipation. Lithium and zinc-air chemistries also suffer from low specific energy (~250 Wh/kg, ~600 Wh/kg, respectively) which directly translates to reduced mobility, maneuverability, and dexterity.

An ultra-high power density version of a high energy density micro fuel cell (MFC) technology overcomes the limitations of the state of the art power sources. This passive technology has achieved >2000 Wh/L and >2000 Wh/kg at small scales. The primary challenge to achieving small scale requirements is to increase power density by ~20×, while maintaining high system energy density and specific energy. Fuel cell chemical/electrochemical reaction rates are increased over prior rates by leveraging significant self-heating by optimizing the thermal design of the packaging. In addition, convective mass transfer is created by using an internally-recirculating electrostatic micro pump.

High practical fuel energy density (2175 Wh/L) and specific energy (2137 Wh/kg) may be achieved via a chemical hydride (lithium aluminum hydride) hydrolysis reaction with water vapor recovered from a hydrogen-air proton exchange membrane (PEM) fuel cell.

Water vapor produced by the fuel cell is captured and used internally to generate hydrogen, rather than being dissipated to the ambient environment. This mitigates the flooding and environmental sensitivity problems associated with air cathode devices (e.g. zinc-air batteries, conventional hydrogen-air fuel cells) and enables the fuel cell to achieve significantly higher power density.

Ultra-thin, convectively-enhanced micro fabricated fuel cells which exceed the power density limitations of conventional planar passive fuel cells may also be used.

An internally-recirculated, electrostatically-actuated dual diaphragm micro-pump is used in one embodiment to enhance mass transport and reaction rates, and increase power density.

Thermally-optimized conventional packaging may be used to raise internal temperatures to >60° C., increasing chemical/electrochemical reaction rates.

Adaptive vacuum-insulated packaging based on nanoporous silica may optionally be used to extend the operating temperature range of the power source down to −30° C.

Figure 1:
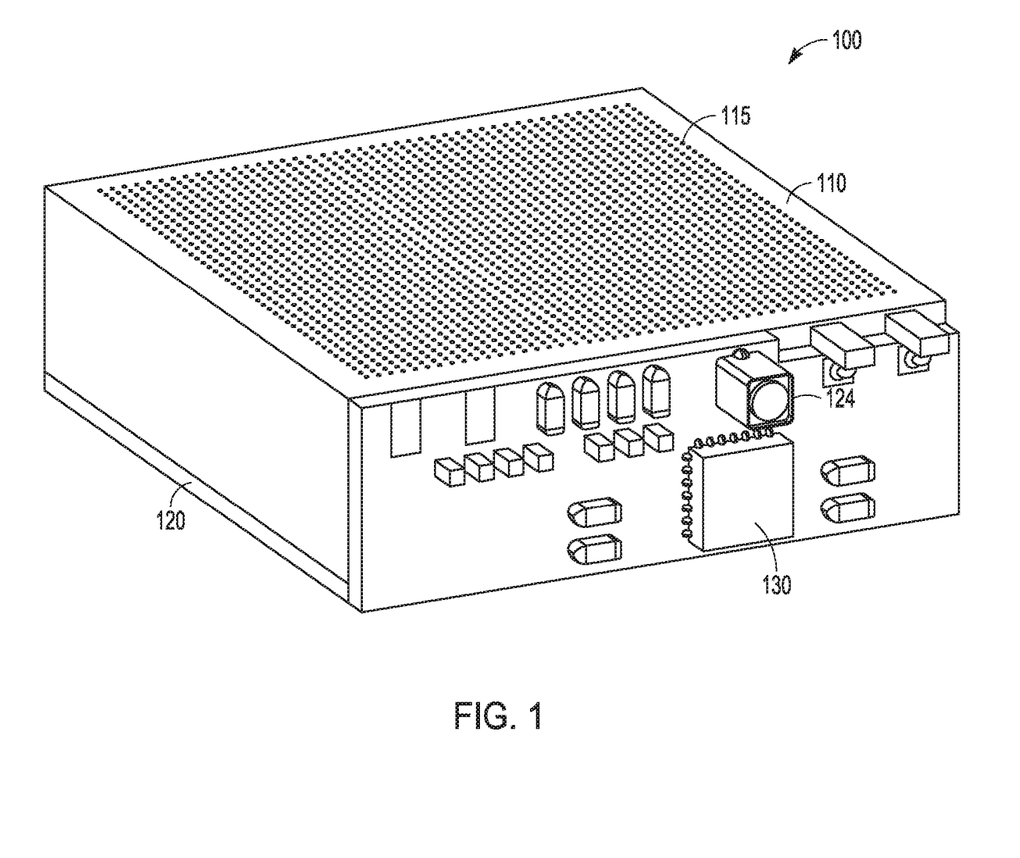
FIG. 1 is a perspective representation of a fuel cell-based power generator according to an example embodiment.

FIG. 1 is a perspective representation of a fuel cell-based power source or generator 100. generator 100 in one embodiment includes a case 110 having air vents 115 to allow air from ambient to reach a fuel cell based power source enclosed within the case 110. A capacitor 120 may be coupled to the case or serve as a side, such as a bottom side of the case. The capacitor 120 is electrically coupled to the power source to provide surge currents when demand from an electrical load 125 exceeds the ability of the power source's current capability. A controller 130 may be coupled to the case 110 or enclosed therein in some embodiments to provide intelligent control of operation of the generator 100 as described in further detail below.

Figure 2:
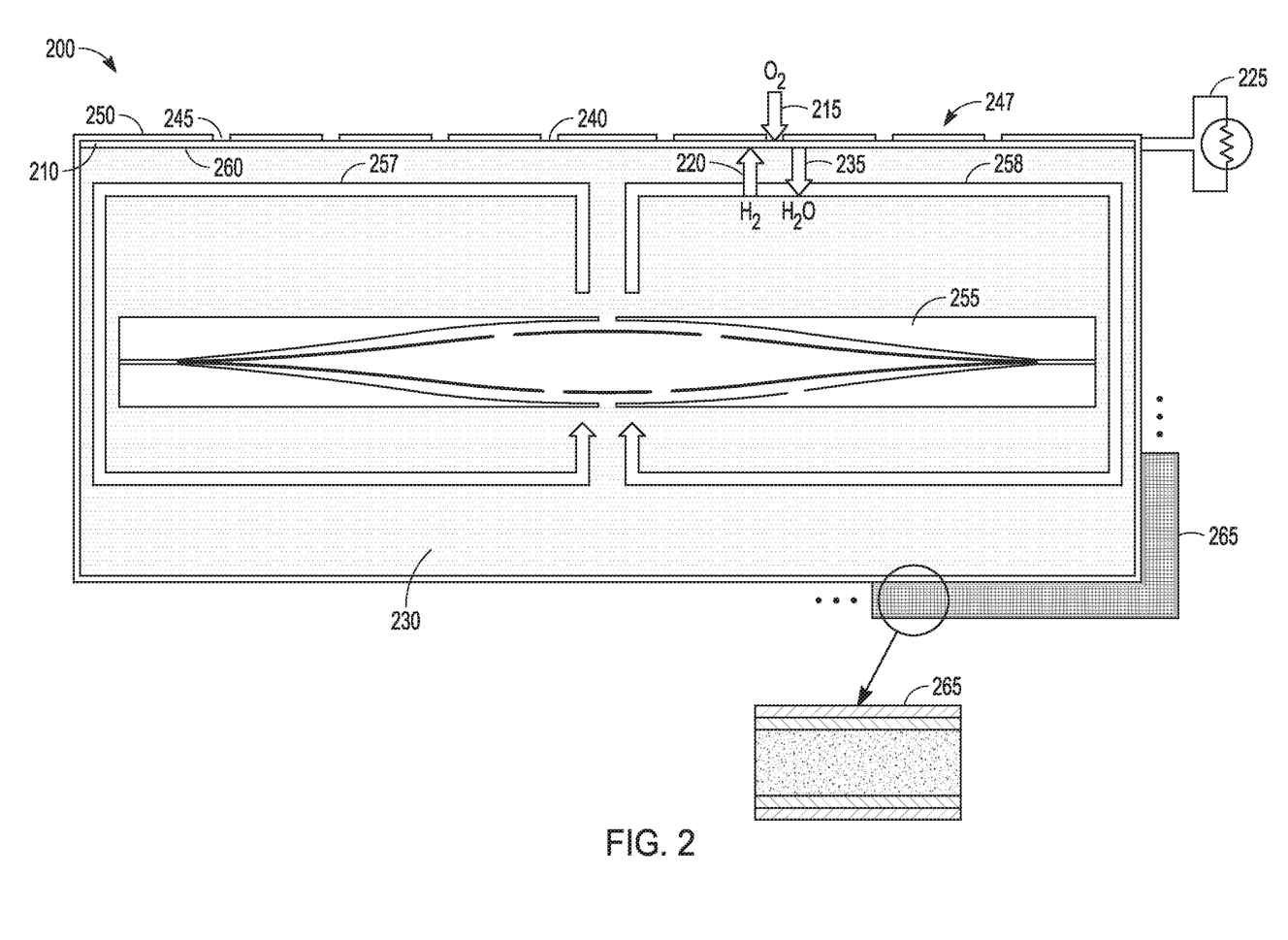
FIG. 2 is a block schematic cross section diagram of a fuel cell-based power source according to an example embodiment.

FIG. 2 is a block schematic cross section diagram of a fuel cell-based power source 200 that may be enclosed within case 110. Power source 200 is based on a micro-scale proton exchange membrane (PEM) fuel cell 210 that converts oxygen 215 (from air) and hydrogen 220 (generated internally) into electrical power 225. Hydrogen is generated via a spontaneous hydrolysis reaction between water vapor and a porous, highly-engineered chemical hydride fuel 230 (e.g. lithium aluminum hydride (LAH)) contained within a fuel cell container 250.

The water vapor 235 used for the hydrolysis reaction is produced at the fuel cell cathode 240 and directed to the reactive, hygroscopic fuel 230 by virtue of a large diffusion resistance (e.g. small pinholes 245 in the container 250 of the power source 200 that have a combined surface area to restrict oxygen flow to the fuel cells 210 to that which meets the desired power output—200 mW in one embodiment) between the fuel cathode 240 and the ambient environment 247. Note that the pinholes 245 are distributed over the surface of the container 250 proximate the fuel cell cathode 240 to promote uniformity of oxygen provided to the fuel cell cathode 240.

A membrane diaphragm pump 255 creates internal convective currents represented by arrows 257 and 258 that circulate water vapor within the porous LAH fuel 230, and provide hydrogen 220 to an anode 260 of the fuel cell 210. One or more pumps 255 may be placed near a center of mass of the fuel 230 for optimal circulation or other convenient location within the fuel 230. Heat generated by the fuel cell 210 and the exothermic hydrolysis reaction is trapped within the fuel cell 210 by either conventional packaging provided by container 250 (baseline approach for 20° C. to 60° C. operation) or highly-insulating adaptive micro-vacuum insulation 265 (optional approach for −30° C. to 60° C. operation), and raises the internal temperature to increase LAH chemical reaction, mass transport rates, and fuel cell power density. Higher operating temperatures in conjunction with the diaphragm pump 255 provide an improvement in power density, while maintaining previously demonstrated energy density and specific energy metrics. Further details regarding the pump are provided below.

An ultra-thin lithium capacitor 270 is positioned at the base of the power generator, and provides short-duration pulse power capability, as well as power for the Power Management and Control electronics 130 prior to activating the fuel cell 210.

Figure 3:
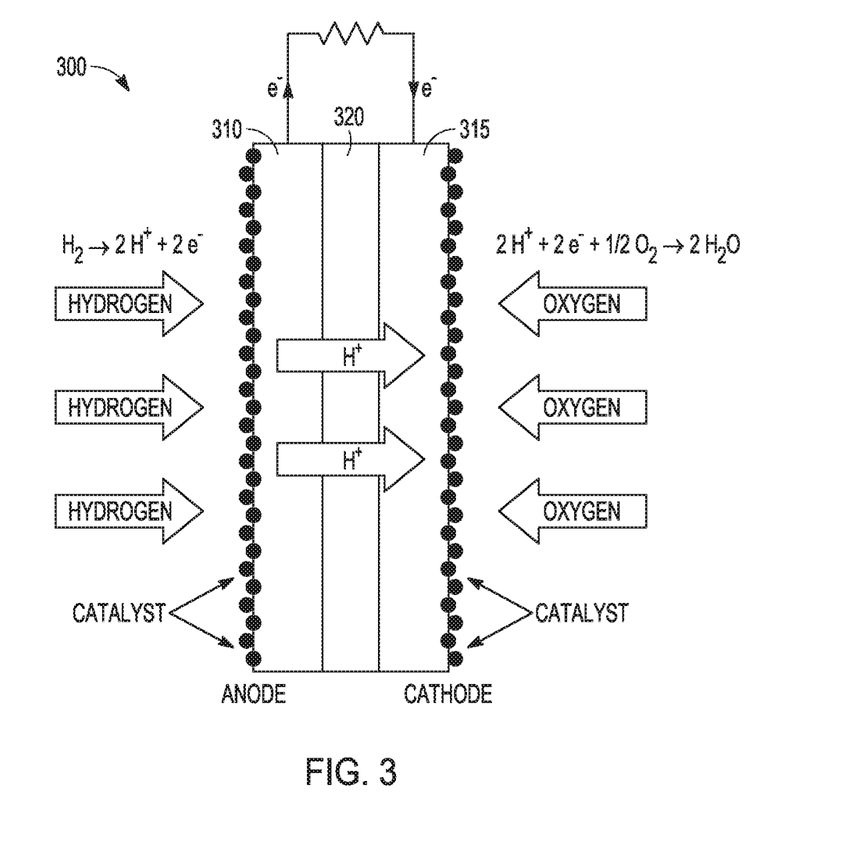
FIG. 3 is a cross section schematic representation of the PEM fuel cell 300 according to an example embodiment.

FIG. 3 is a cross section schematic representation of the PEM fuel cell 300 according to an example embodiment. Fuel cell 300 includes a proton conducting membrane 310 with thin catalyst electrodes, anode 315 and cathode 320 applied to both side sides. Hydrogen is provided to the anode 315 and oxygen to the cathode 320. Hydrogen is ionized (to protons and electrons) at the anode, and the resulting protons are conducted through the membrane 310, while the electrons travel through an external circuit 325, also referred to as a load (performing electrical work) and recombine with oxygen from air at the cathode, by the overall reaction $4H_2 + 2O_2 \rightarrow 4H_2O + $ Energy.

Planar PEM fuel cells are typically constructed from numerous layers (e.g. current collectors, gas diffusion layers, PEM, gas seals) that are laminated and compressed between thick, perforated end plates. Even very thin designs are often 500-1000 µm thick and would be impractical for some micro applications.

Figure 4:
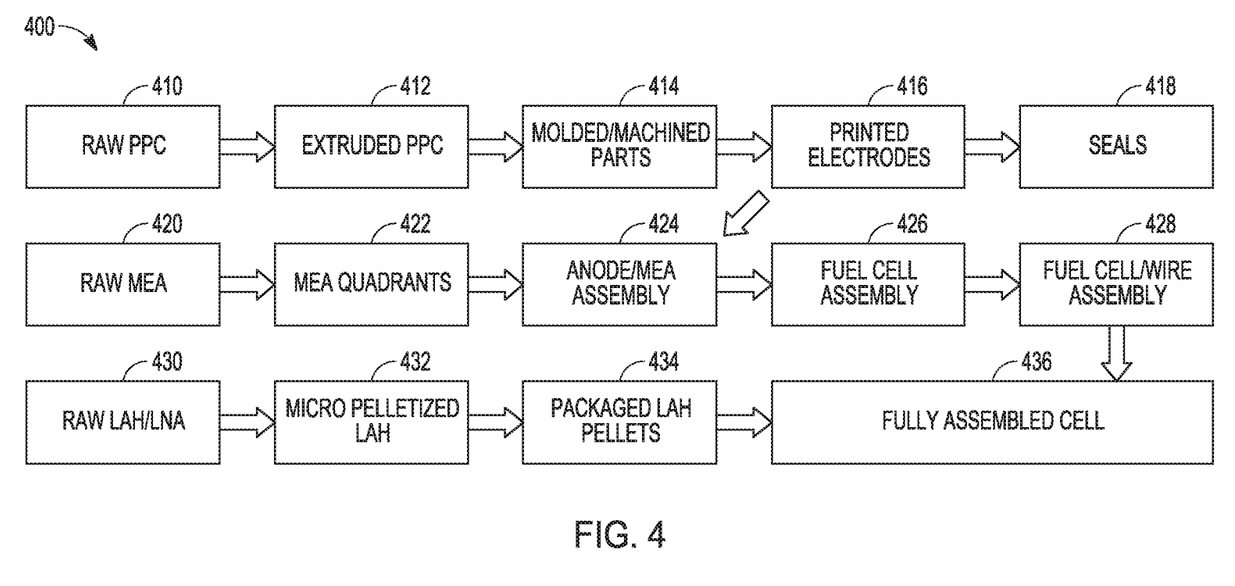
FIG. 4 is a series of images representing a first approach 400 for building ultra-thin fuel cells according to an example embodiment.

To address this limitation two different approaches to building ultra-thin fuel cells (50-150 µm thick) are described. FIG. 4 is a series of images representing a first approach 400 for building ultra-thin fuel cells. Raw PPC 412 is extruded 412 and molded, machined, or molded and machined as shown at 414 into parts. Electrodes are printed and seals added as shown at 416 and 418 respectively. At 420, raw MEA is obtained and formed into MEA quadrants 422. The parts with printed electrodes and seals 418 are combined with the quadrants into and anode/MEA assembly 424 and the formed into a fuel cell assembly 426. Wires are added to form fuel cell/wire assembly 428.

Raw LAH/LNA at 430 is obtained and processed to form micro pelletized LAH at 432 which is packaged into LAH pellets 434. The fully assembled cell is shown at 436 with a US quarter shown as an example of one size.

In further detail, the gas diffusion layers (typically 2×@100 µm thick) and current collectors (typically 2×@200 µm thick) are eliminated and replaced with flow channels that are machined/molded into the device packaging, with current collectors and adhesive gas seals printed or deposited directly on the packaging surfaces. Catalyst-coated PEM segments are laser/die cut and placed (using a pick-and-place robot with a vacuum chuck/vision system) on the adhesives and the layers are compressed together to form a gas-tight integrated planar fuel cell 436. Series electrical connections are formed by vertical vias made of conductive adhesive/epoxy, while parallel connections are achieved using common current collectors. This results in an ultra-thin fuel cell (~50-150 µm) integrated with the device packaging.

Multiple cells can be configured in series and/or parallel, giving flexibility in output voltage in roughly 0.6-0.8V increments (under load). The practical upper limit for the number of series-connected cells is based on fabrication/assembly tolerances, which impact the ability to achieve reliable electrical isolation between cells. Using the pick-and-place assembly process described above, at least 20 cells may be configured in series, giving an output potential of 12-16 Volts. If desired, even higher potentials are possible using well-established micro fabrication techniques in which the catalyst coated PEM is constructed in situ (e.g. photo patterned and sputter-deposited PEM and catalyst electrodes.

Alternatively, a thicker design may be used in which the current collectors and flow channels are fabricated using custom Kapton flex circuits, and the remaining materials (adhesive gas seals, PEM, selectively permeable membrane) may be laser cut from thin sheet stock materials and assembled using established methodologies (e.g. pin-fixtures for alignment/placement).

An example output voltage of 2.8 to 3.2V may be achieved with 4 cells connected in series, with cell potentials ranging from 0.7V to 0.8V. Higher output potentials may be desirable to improve the efficiency of the power conversion electronics (i.e. by reducing the voltage multiplication ratio). Further embodiments may be constructed based on choice of output voltage and construction approach to ensure compatibility with application specific electrical requirements.

Figure 5:
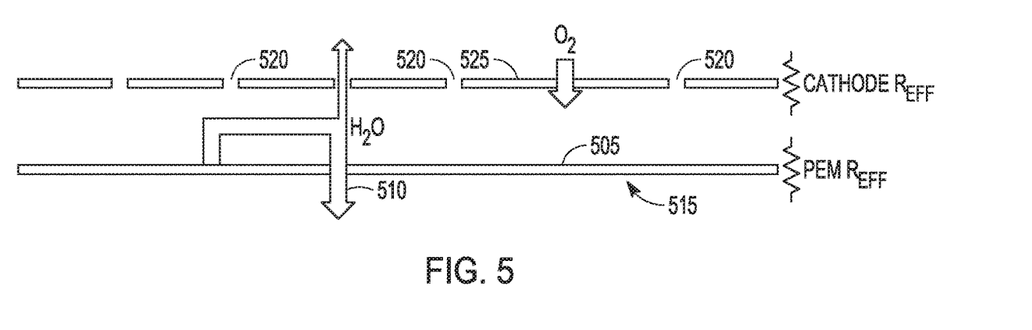
FIG. 5 is a schematic block diagram illustrating a hydrolysis reaction of the fuel cell according to an example embodiment.

The fuel cell may be designed to trap and return water vapor generated at the cathode, making it available to react with the solid hydride fuel to produce hydrogen, as illustrated by a schematic block diagram in FIG. 5 at 500. The stoichiometry of the hydrolysis reaction requires that ~60% of the water vapor produced at the cathode 505 be returned to the fuel as indicated by arrow 510. This is enabled by two factors: 1) the high-water permeability of the PEM under the intended operating conditions, and 2) the large water vapor concentration gradient established between the fuel cell cathode 505 and the fuel 515, achieved using a "cathode restriction". A cathode restriction is essentially an array of pinholes 520 in the cathode current collector 525 that are sized to allow sufficient oxygen to diffuse into the cell to meet the average power target (e.g. 200 mW), but no larger. In other words, the combined area of the pinholes 520 is a design point that is selected to restrict the oxygen flow to the cathode 505 to limit power generation to the designed value. For a 200 mW design, the effective "diffusion resistance" (in S/cm, defined such that concentration=resistance×flow) is $R_{cathode} \approx 2.8$ S/cm. Data collected on PEM water transfer properties indicates that that $R_{membrane} \approx 0.3$ S/cm under intended operating conditions.

In some embodiments, the fuel cell reaction utilizes 0.5 moles of hydrogen per mole of water produced. The $O_2$ concentration in air (ambient) is approximately 20%, and the water concentration typically ranges from 1-2% resulting in an oxygen to water ratio of 10 to 20×. Given these parameters, the size and density of the pinholes that provide oxygen to the cathode may be easily designed for a known average power level.

The hole sizes limit oxygen by providing a diffusion resistance, and the ratio of oxygen to water vapor causes the limited oxygen to limit the amount of water vapor, which in turn limits the fuel cell average power level.

The fuel cell PEM is divided into (catalyzed) regions for power generation, and un-catalyzed (e.g. bare PEM) regions for water recovery. Given the diffusion resistance values discussed above, an un-catalyzed area fraction of 38%, and selecting local concentration values consistent with those observed in prior work, we can easily achieve the 60% water vapor recovery rate required meet the stoichiometry of the hydrolysis reaction.

In one embodiment, a 200 mW (average) may be provided by the fuel cell and 600 mW pulse power may be handled by the lithium-capacitor. A power source footprint of 0.7×0.7 cm is allocated in the following manner. 10% of the surface area may be allocated to gas seals/cell isolation, and 38% of the remaining area to water recovery, leaving 0.27 cm² for fuel cell power generation, which translates to 730 mW/cm². Fuel cell power density is improved by virtue of creating convective mass transfer at the anode (with the micropump), and by improving humidification at the cathode by trapping the water that is produced via the cathode restriction, thereby addressing the fundamental reasons for low power density in planar passive designs.

In further embodiments, power output in a same footprint may be doubled simply by fitting fuel cells to the top and bottom of the power generator, and increasing power even further by corrugating the fuel cell to create extra surface area.

Figure 6:
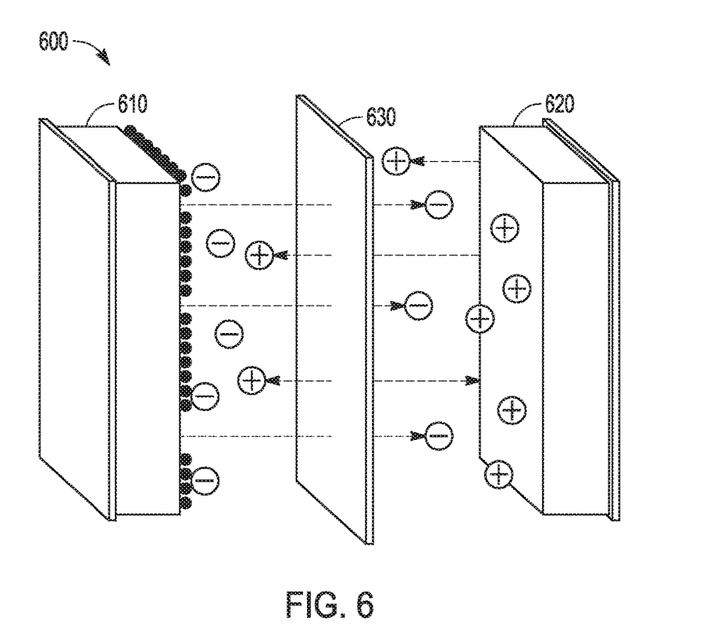
FIG. 6 is an exploded block schematic view of a capacitor of the power source according to an example embodiment.

Capacitor 120 is shown in further detail with an example image in FIG. 6 at 600 as an exploded block schematic view. Capacitor 120 provides the ability to achieve a 600 mW peak power target, serving as a charge storage device to handle the power in excess of the 200 mW fuel cell capability. In one embodiment, a General Capacitor (GC) Lithium Capacitor may be used. Capacitor 120 in one embodiment utilizes the cathode 610 architecture of an electrochemical double layer capacitor (EDLC) and the anode 620 architecture of a lithium-ion battery to deliver performance (power density, energy density) approximately midway between the two technologies. A separator layer 630 separates the cathode 610 and anode 620. In one embodiment, the cathode 610 act as an electrostatic double layer and comprises an aluminum layer and a high surface area activated carbon layer to which electrons cling. The anode 620 operates as an electrochemical Lithium-ion intercalation and comprises a copper substrate and graphitic carbon active material.

Given a footprint of 0.7×0.7 cm, the capacitance is calculated to be 0.122 F and the equivalent series resistance (ESR) is 2.5 Ohm. Thus, for a single capacitor with open circuit voltage (OVC) of 3.8V, a 0.3V drop is encountered during each 600 mW (400 mW net of the fuel cell power) power pulse. Assuming the capacitor is discharged from 3.8V to 2.8V during the pulse, the pulse duration is ~2 seconds is provided, which should be sufficient for short duration actuation/transmission events of IOT devices. The ESR and optimal load impedance for the fuel cell capacitor combination should be ~1.6 Ohms, assuming a 3.8V OCV (4 series fuel cells in parallel with one 3.8V capacitor). Other voltage and ESR values are possible, as discussed above. Note that all the dimensions and electrical capacities may be varied for different applications, including applications other than LOT devices.

The case 110, referred to as packaging provides desired mechanical, thermal, and integration flexibility. The packaging accommodates the expansion forces produced by the fuel 230 without excessive deflection or rupture, while minimizing weight and volume. Thermal resistance values in a selected range keep the fuel cell system in the right temperature range (60° C. to 120° C.). The fabrication and integration process is sufficiently flexible to enable integration with actuators and micro robotic platforms of different shapes, sizes, and surface conditions.

A first packaging embodiment is based on conventional (non-insulating) materials (e.g. metals, ceramics, carbon fiber) that meet the thermal requirements of a 20° C. to 60° C. temperature range. A second packaging embodiment is based on insulating materials, such as insulation 265 that may be an adaptive nano-porous vacuum insulation to extend the operating temperature range from −30° C. to 60° C.

In one embodiment, a thin-walled carbon fiber is used for the walls of the fuel container and the planar fuel cell. Machined aluminum and 3D printed polymers may be for prototyping, while commercial embodiments may be constructed from either a high-strength metal (e.g. titanium, stainless steel), ceramic, or more likely carbon fiber to reduce weight, depending on the measured fuel expansion forces and maximum tolerable packing expansion. In one embodiment, an approximately 100 μm thick carbon fiber should be sufficient. In one embodiment, the inside of the fuel cell should be maintained between 60° C. and 120° C. to meet high power density requirements. Conventional packaging materials may be sufficient for operation within 20°-60° C. Insulating packaging may be used to facilitate fuel cell operation down to ambient temperatures of <−33° C.

In one embodiment, conventional packaging may be replaced with adaptive thermal insulation to extend the operating range of the fuel cell to very low temperatures (~−30° C.). One form of adaptive thermal insulation includes the use of a vacuum insulated panel (VIP) (based on evacuated nano-porous silica) that can be fabricated in arbitrary 3D form factors. VIP allows for miniature vacuum insulation in arbitrary three-dimensional form factors to adapt to complex custom geometries, by using a multi-layer Parylene and sputtered aluminum encapsulate. Applying just 200 μm of this insulation to the fuel cell packaging will enable operation down to ~−30° C. To prevent overheating at higher temperatures, trace amounts of a low-vapor pressure material such as propylene glycol or naphthalene may be added to the evacuated volume of the VIP to modulate the insulation by changing ambient temperature, enabling temperature stabilization over a broad range of ambient temperatures.

Figure 7:
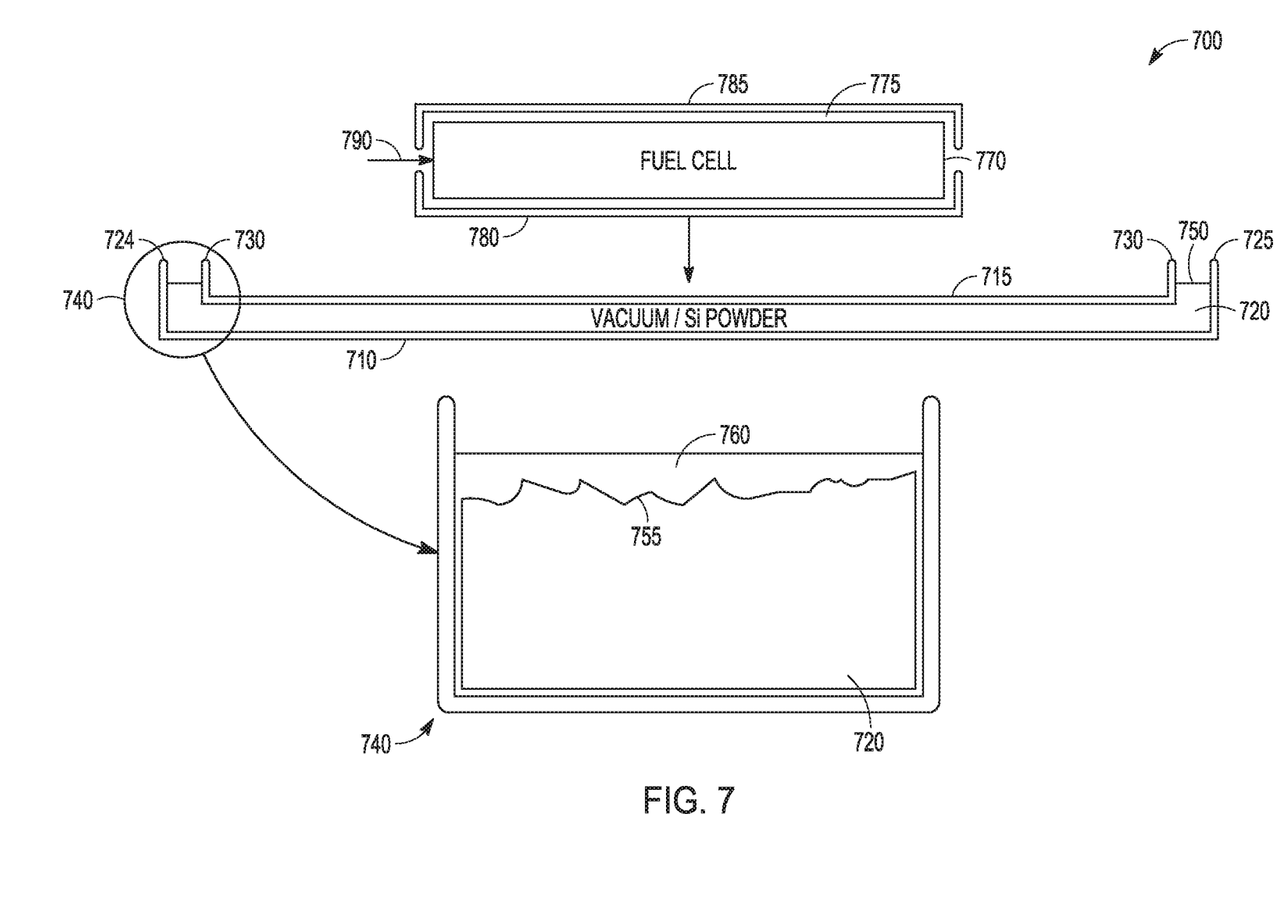
FIG. 7 is a block diagram cross section representation of a thermal insulator according to an example embodiment.

FIG. 7 is a block diagram cross section representation of a thermal insulator 700 corresponding to insulation 265. The thermal insulator may be formed for an outside plate 710 spaced from an inside plate 715 by a nano-porous material 720. In one embodiment, the plates may be similarly shaped and of slightly different sizes such that the inside plate 715 may nest inside the outside plate 710, creating a space between them that the material 720 occupies. In one embodiment, the space may be fairly uniform between the plates.

In one embodiment, the plates have sides indicated at 725 and 730 that extend away from generally planar portions of the plates. The distance between the sides 725 and 730 may be the same as the distance between the generally planar portions of the plates or may vary in further embodiments. The shape of the generally planar portion of the nested plates may be circular, oval, rectangular, or any other shape desired, such as a polygon. The sides of the plates extend along the entire perimeter of the generally planar portions. In still further embodiments, the generally planar portions of the plates may be curved as opposed to planar. Note that while the distance between the plates and sides of the plates is substantially equal in some embodiments, the distance may be varied in further embodiments where substantially uniform insulation is not needed.

A portion 740 of the sides of the plates is illustrated in further detail in a blown-up view also at 740. The blown-up view of portion 740 illustrates a sealing layer 750 that helps maintain a vacuum within the nano-porous material 720. In one embodiment, the sealing layer 750 includes a layer of a polymer 755, such as Parylene or other low thermally conducting material and a metal layer 760 of low thermally conducting metal, such as aluminum or NiCr for example. A further polymer or other layer may be included in further embodiments.

In one embodiment, the polymer or plastic layer 755 may be between approximately 50 to 200 μm thick. The metal layer may be approximately 80 nm thick. The purpose of the sealing layer 750 is to help maintain a vacuum, which may be simply a low pressure as opposed to an absolute vacuum, within the space between the plates. Thus, the thickness of each layer may be varied based on the material used to maintain the vacuum for a desired length of time. Since the metal layer may be more thermally conductive, it is desirable in some embodiments to utilize a metal and a thickness of the metal that minimizes its thermal conductance between the plates. The vacuum provides an area of low thermal conductance, K. As such, it may be varied between absolute and ambient pressure depending on the overall thermal properties desired. Ambient pressure may correspond to atmospheric pressure, which may vary with weather conditions and altitude or depth. In one embodiment, the vacuum is kept between 0 and 100 Pa (Pascal-Newtons/Meter$^2$). Note that the portion 740 shown is provided for illustration of the sealing layer 750 and may not be reflective of the actual shape of the portion 740.

In one embodiment, the material 720 may be a low-density (200-250 kg/m^3) mixture of fumed silica, fiberglass, and silicon carbide (and optionally getter materials to getter gas resulting from outgassing or leakage through the seal) may be pressed into a custom form factor enclosure, such as the two nesting plates 710 and 715. The fumed silica mixture fills the gap between the two nested plates that comprise an enclosure. The mixture is a nano-porous open cell material in one embodiment such that a significant portion of the value occupied by the material is open, as opposed to closed cell materials. A small gap thermally isolates the two plates; this gap is may be coated with a thin, low-thermal conductivity material (or materials) and forms a gas seal as indicated by sealing layer 750.

The space between the plates is evacuated, forming an enclosure with very high thermal resistance between the inner and outer plates. In one embodiment, a device 770, such as a fuel cell based power generator, can be placed within a pocket 775 created by two enclosures 780 and 785, and provide very high thermal resistance between the interior of the pocket and ambient environment. In the case of some fuel cells, the two enclosures may not be sealed together, to allow at least oxygen, indicated by arrow 790, from ambient to reach the device 770 for operation of the device by exposing the pinholes to ambient air. In further embodiments, where access to ambient is not needed, the enclosures may be sealed together by glue, welding, clamping, or other means of attaching the enclosures together.

In some embodiments, a vapor generating material is included in the material 720. The vapor generating material may have a pressure vs. temperature relationship that modulates the thermal conductance of the vapor in the gap between the enclosure plates, over a desired temperature range.

The vapor generating material may be selected such that vapor pressure is in a desired range (e.g. 100-1000000 Pa for Nano-porous silica) which modulates the thermal conductivity of the vapor over the desired ambient temperature range. Example materials include cyclohexane or water vapor. Different vapor generating materials may be selected depending on the pore size of the silica. Low density, small pore size materials other than silica may also be used if a different thermal resistance value or temperature range is desired. Other materials may include Isopropanol, 1-Butanol, Cyclohexane, Ethanol, and Ethyl acetate. In some embodiments, only one of the example materials or still other materials which generate vapor at a desired temperature is used.

Figure 8:
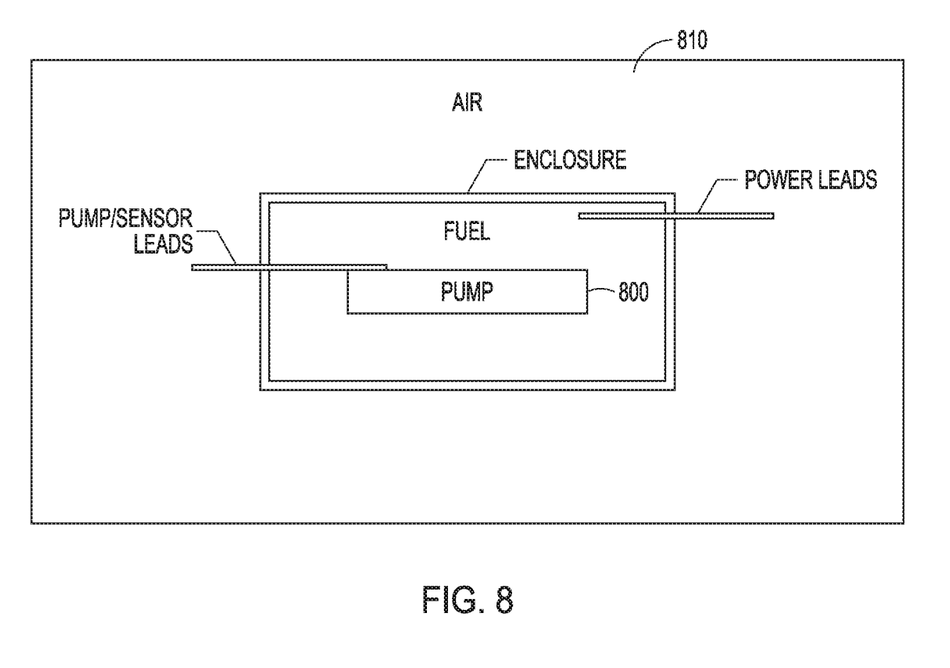
FIG. 8 is a block diagram of a micro pump of the power source according to an example embodiment.

FIG. 8 is a block diagram of a micro pump 800 for use as micropump 265 in FIG. 2. Micro pump 800 provides convective flows to circulate water vapor from the PEM anode through the fuel and return hydrogen to the anode. As shown in FIG. 2, the micro pump 800 may be positioned within the fuel 810 to provide such circulation. In one embodiment, a dual diaphragm pump uses two electrostatically-driven diaphragms that double as valves.

Figure 9:
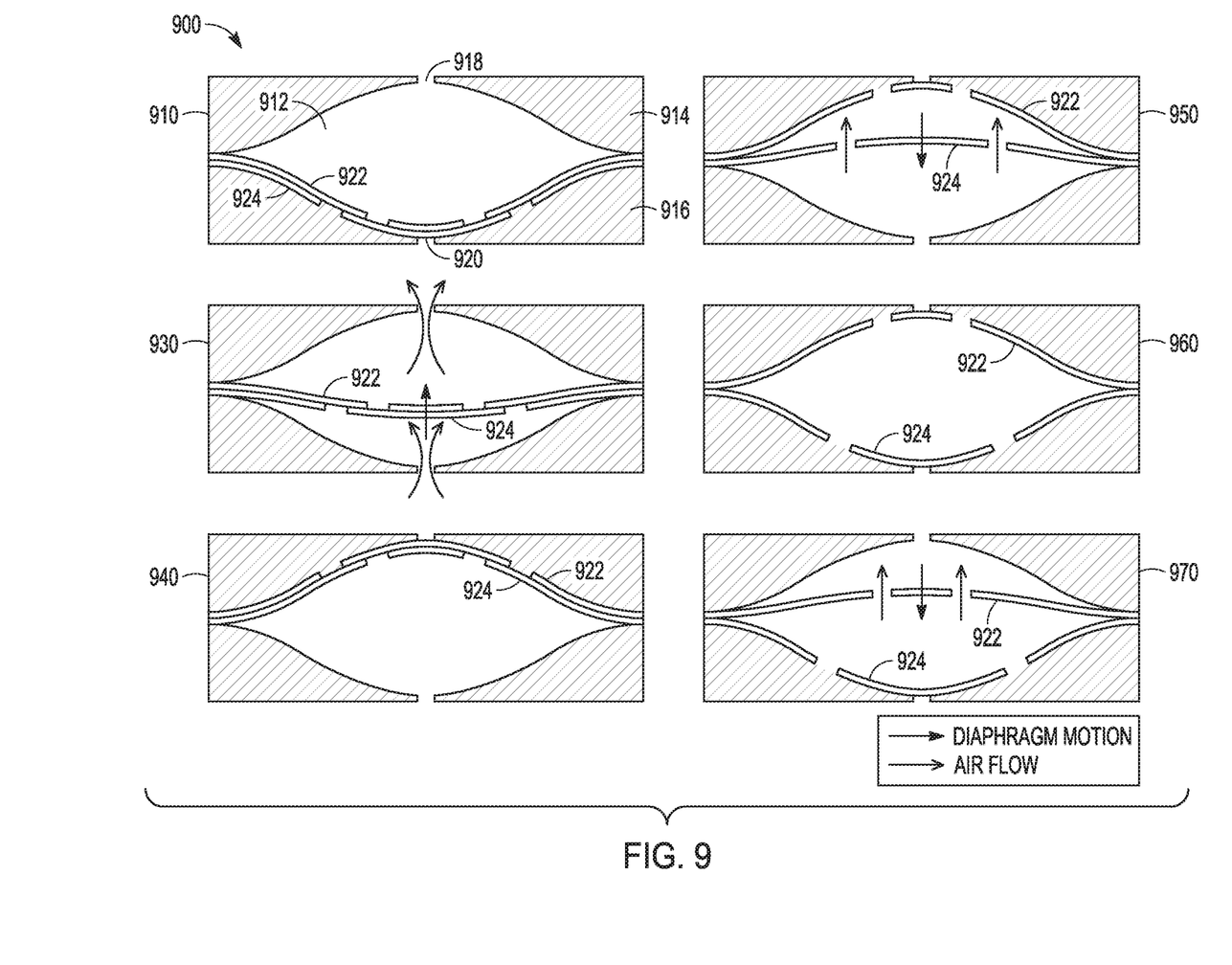
FIG. 9 is a time series set of block diagrams illustrating operation of the micro pump of the power source according to an example embodiment.

FIG. 9 at 900 shows a series of block diagrams illustrating operation of the pump. Each of the diagrams is numbered consistently. At diagram 910, a chamber 912 is formed by an upper section 914 and a lower section 916. Each of the sections includes respective openings, referred to as upper and lower ports 918 and 920 with two flexible diaphragms, an upper diaphragm 922 and a lower diaphragm 924 disposed between the sections. In diagram 910, both diaphragms are shown in a down position, sealing the lower port 920.

The dual actuation ability of the pump allows independent actuation of the diaphragms. In diagram 930, both diaphragms may be moved together upward, causing air flow into the bottom port from the fuel and out of the top port into the fuel. In diagram 940, the upward motion of both results in the top port being blocked by both diaphragms. In diagram 950, the lower diaphragm is moved downward while the upper diaphragm remains in a position to block the upper port. This results in air being directed out of the lower port. Continuation of the lower diaphragm results in the positions shown in diagram 960, with both upper and lower ports being blocked by the respective upper and lower diaphragms. The upper diaphragm is then moved down as shown in diagram 970 with the lower diaphragm held in place, blocking the lower port. This results in air being drawn into the chamber 912 through the upper port 918. Continuation of that motion results in the positions shown in diagram 910. This sequence may continue to circulate air and water vapor through the fuel.

Figure 10:
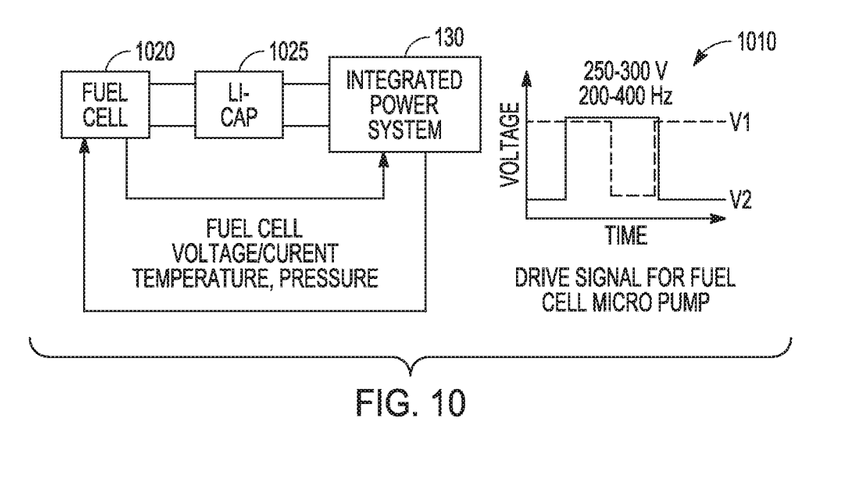
FIG. 10 is a block schematic diagram of a controller of to power source according to an example embodiment.

Controller 130 is shown in further detail in block schematic form in FIG. 10 in the context of a power generation system 1000. Controller 130 is used to control the power generation process and maintain steady power production. The controller may be programmed with software to provide power management and control and to sense certain operating parameters (voltage, current, temperature, and pressure) and provide a drive signal 1010 to the micro pump. The signal 1010 is shown as a pair of square waves to independently move the diaphragms of the micro pump. The controller is also coupled to the fuel cell 1020 and capacitor 1025. The controller may be used to control the fuel cell and receive voltage, current, temperature, and pressure measurements via one or more sensors associated with the fuel cell.

In one embodiment, the fuel is a solid LAH fuel comprised of small grains, compressed into granules on the order of 0.05 mm. The granules allow gas to flow between them without large pressure drops; when water vapor reaches unreacted fuel, it reacts as $LiAlH_4 + XH_2O \rightarrow 4H_2O + Solids$ (X varies on environmental conditions; see Fuel Expansion).

Smaller grains, which are difficult to achieve in the large quantities can be used for the fuel. Use of milled fuel indicates that decreasing grain size increases rate, with the highest rates achieved at the smallest grain sizes.

Because water vapor must diffuse through the granule, smaller granules lead to higher reaction rates, but at the expense of higher pressure drop. This tradeoff may be varied for different applications.

Hydrolysis rate enhancement may be achieved with similar chemistries (Alane) using hydroxides and hydroxide precursors such as Alane mixed with 5-wt % and 10-wt % LiH. As LiH hydrolyzes it produces LiOH, which attacks the aluminum oxide passivation layer on the Alane, significantly enhancing reaction rates and yields. Similar approaches to increasing LAH hydrolysis reaction rates may be used. Examples of relevant promotors described in the literature include KCl applied to Al—LiH hydrolysis and $TiCl_3$ applied to a range of hydride/hydroxide solid-state reactions. A series of screening tests may be used on these and similar chemicals by running hydrolysis reactions with 10-wt % promotor, and performing a down selection.

Expected peak pressure numbers may be used for design parameters of the micro pump and external system packaging. To extend shelf life prior to use, ingress of oxygen and moisture into the system can be avoided by using a tear-away foil to close the cathode and protect the cell and LAH from air while being stored or handled prior to use, similar to zinc-air batteries and other open-cathode power source technologies. As an added measure, during storage the fuel cell (or the entire device to be powered by the fuel cell, such as a robot or IOT device) could be packaged in a hermetic container with oxygen and moisture absorbing materials such as Oxy-Sorb.

Fuel cell startup may be initiated by removing the fuel cell from its hermetic packaging and tearing away the adhesive-backed foil covering the cathode, allowing access to air. Prior to removing the foil, the power required for the Power Management and Control Electronics may be supplied by the lithium capacitor. Initial fuel cell power output (available immediately after the foil is removed) will be on the order of 10 mW, ramping to full power over the course of ~300 seconds, as the internal temperature rises to its operating point.

To reach full power, the internal temperature will rise to ~60° C.; the temperature rise is enabled by self-heating via the waste heat generated by the fuel cell and fuel hydrolysis reactions. To rapidly (e.g. In ~300 second) reach operating temperature, the power management electronics may initiate a startup sequence which electrically shorts the fuel cell such that all of the power being generated is converted to heat. Thus the fuel cell system will "boot-strap" itself to its nominal operating conditions via self-heating.

The hydrogen required to initiate the reaction may be included in the pore space of the fuel during manufacturing. Optionally, a small amount (1-2 volume %) of an interstitial metal hydride such as $LaNi_{4.5}Al_{0.5}$ (LNA) may be added to the fuel, which acts as a "hydrogen sponge" that desorbs hydrogen based on temperature. The LNA passively releases hydrogen independent of the present of water and provides extra hydrogen to quickly reach operating temperature. In still further embodiments, startup may be facilitated by external heat sources, such as using an external battery and heaters embedded in packaging, or a heater/hot plate or box to reach operating temperature.

The fuel cell cathode may be covered by a selectively permeable membrane (SPM), (a Gore Tex type EPTFE membrane) which allows permeation of gases but prevents liquids or solid contaminates (e.g. dust, dirt, mud) from entering the system.

Fabrication of the micro pump largely follows prior known processes, such as outlined by Cabuz 2001. The two halves of the pump body are printed/machined (prototypes from aluminum or printed polymer, final devices from stronger material such as aluminum-sputter-coated silicon carbide as necessary), leaving small alignment holes at the edges. The original work then used an ion-beam sputtering process to coat the body with a dielectric material. Atomic Layer Deposition (ALD) techniques have become available and may be used as an alternative method of manufacture as it may provide superior quality coating, (e.g. free of defects, pinholes) enabling higher operating voltages and pump speed. The pump membranes may begin as aluminized Kapton, and ALD may be used to deposit the dielectric coating. The membranes are then cut with a laser. Using alignment fixtures, the membranes are sandwiched between the body plates and adhered with adhesive (pressure sensitive adhesive, epoxy).

The bottom half of the system package forms a cup to fill with fuel. The cup may be fabricated as a stand-alone part, or it could be integrated into a device that uses the power source. The fuel cup may be built on the Lithium Capacitor, the Power System Electronics, or the load the power source is driving. Likewise, the Lithium Capacitor could be integrated with an electronics board. Hydrogen generation is not sensitive to the geometry of the fuel cup, so long as there is sufficient space for the pump.

The fuel-cell may be constructed separately and integrated with the fuel chamber with adhesive (pressure sensitive adhesive, epoxy) inside a nitrogen-purged glove box environment. A temporary adhesive seal is placed on top of the completed device. Once the seal is removed, the device is ready for use.

Figure 11:
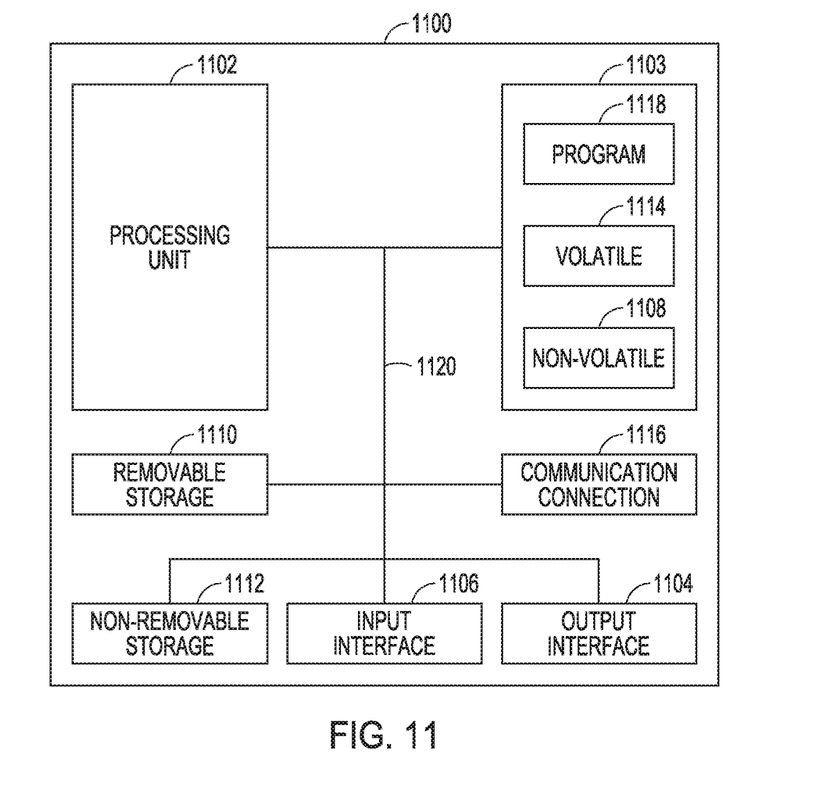
FIG. 11 is a block diagram of processing circuitry for implementation of the controller and control software for performing control operations according to an example embodiment.

FIG. 11 is a block schematic diagram of a computer system 1100 to implement the controller 130 and execute code to perform operations to manage the power source as described above, and for performing methods and algorithms according to example embodiments. All components need not be used in various embodiments.

One example computing device in the form of a computer 1100 may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, smart storage device (SSD), or other computing device including the same or similar elements as illustrated and described with regard to FIG. 11. Devices, such as smartphones, tablets, and smartwatches, are generally collectively referred to as mobile devices or user equipment.

Although the various data storage elements are illustrated as part of the computer 1100, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) or electrically erasable programmable read-only memory (EEPROM), flash Memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1100 may include or have access to a computing environment that includes input interface 1106, output interface 1104, and a communication interface 1116. Output interface 1104 may include a display device, such as a touchscreen, that also may serve as an input device. The input interface 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1100 are connected with a system bus 1120.

Computer-readable instructions stored on a computer-readable medium are executable by the processing unit 1102 of the computer 1100, such as a program 1118. The program 1118 in some embodiments comprises software to implement the control functions of the controller 130. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1118 along with the workspace manager 1122 may be used to cause processing unit 110:2 to perform one or more methods or algorithms described herein.

EXAMPLES

1. A power source includes a container, a fuel cell stack disposed within the container, the fuel cell stack having an anode side and a cathode side, a hydrogen producing fuel disposed within the container and positioned to provide hydrogen to the anode side of the fuel cell stack, and a pump disposed within the hydrogen producing fuel to circulate water vapor through the hydrogen producing fuel.

2. The power source of example 1 and further comprising a capacitor coupled to receive electricity generated by the fuel cell stack.

3. The power source of example 2 wherein the capacitor forms a base of the container.

4. The power source of any of examples 2-3 wherein the capacitor comprises a li-Cap.

5. The power source of any of the preceding examples wherein a side of the container proximate the fuel cell stack contains pinholes to restrict gas flow from ambient to the fuel cell stack.

6. The power source of any of the preceding examples wherein the pump comprises a membrane diaphragm pump.

7. The power source of example 6 wherein the pump comprises a micro pump having two independently actuatable membranes.

8. The power source of example 7 wherein the pump comprises two sections forming a cavity, each section having a port, and wherein the membranes are sandwiched between the two sections and actuatable to pump air between the cavity and the fuel through the ports.

9. The power source of any of the preceding examples wherein the hydrogen producing fuel comprises a hydride fuel.

10. The power source of example 9 wherein the hydride fuel comprises lithium aluminum hydride (LAH).

11. The power source of any of the preceding examples and further comprising an insulator positioned around at least a portion of the container.

12. The power source of example 11 wherein the insulator comprises a vacuum between two layers.

13. The power source of example 12 wherein the vacuum is formed by an evacuated silica plus fiberglass foam.

14. A method of generating electricity includes receiving oxygen from ambient at a cathode side of a fuel cell stack through at least one opening in a container, receiving hydrogen at an anode side of the fuel cell stack from a hydrogen producing fuel in the container, receiving water vapor from the fuel cell stack anode side produced by a reaction of the oxygen and hydrogen at the fuel cell stack, and circulating the water vapor through the hydrogen producing fuel via a pump disposed within the hydrogen producing fuel.

15. The method of example 14 and further comprising charging a capacitor via electricity produced by the reaction of the oxygen and hydrogen at the fuel cell stack.

16. The method of any of the preceding examples and further comprising retaining heat generated by the fuel cell stack by means of a micro-vacuum insulation.

17. The method of any of the preceding examples wherein the fuel pump comprises a micro pump having two independently actuatable membranes.

18. The method of example 17 wherein the pump comprises two sections forming a cavity, each section having a port, and wherein the membranes are sandwiched between the two sections and actuatable to pump air between the cavity and the fuel through the ports.

19. The method of example 18 wherein the membranes are actuated in a sequence to provide air circulation within the fuel.

20. The method of example 19 wherein the membranes are actuatable to block flow of air by acting as valves for respective ports.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A power source comprising:
a container;
a fuel cell stack disposed within the container, the fuel cell stack having an anode side and a cathode side;
a mass of hydrogen producing fuel disposed within the container and positioned to provide hydrogen to the anode side of the fuel cell stack; and
a pump disposed within the mass of hydrogen producing fuel creating internal convective currents to circulate water vapor through the hydrogen producing fuel.

2. The power source of claim 1 and further comprising a capacitor coupled to receive electricity generated by the fuel cell stack.

3. The power source of claim 2 wherein the capacitor forms a base of the container.

4. The power source of claim 2 wherein the capacitor comprises a lithium capacitor.

5. The power source of claim 1 wherein a side of the container proximate the fuel cell stack contains pinholes to restrict gas flow from ambient to the fuel cell stack.

6. The power source of claim 1 wherein the pump comprises a membrane diaphragm pump disposed within and surrounded by the mass of fuel.

7. The power source of claim 6 wherein the pump comprises a micro pump having two independently actuatable membranes.

8. The power source of claim 7 wherein the pump comprises two sections forming a cavity, each section having a port, and wherein the membranes are sandwiched between the two sections and actuatable to pump air between the cavity and the fuel through the ports.

9. The power source of claim 1 wherein the hydrogen producing fuel comprises a hydride fuel.

10. The power source of claim 9 wherein the hydride fuel comprises lithium aluminum hydride (LAH).

11. The power source of claim 1 and further comprising an insulator positioned around at least a portion of the container.

12. The power source of claim 11 wherein the insulator comprises a vacuum between two layers.

13. The power source of claim 12 wherein the vacuum is formed by an evacuated silica plus fiberglass foam.

* * * * *